United States Patent [19]
> Warner et al.

[11] 3,897,133

[45] July 29, 1975

[54] TELESCOPIC OPTICAL SYSTEM

[76] Inventors: David A. Warner, 100 Memorial Dr., Cambridge, Mass. 02142; Irving M. Levin, 39 Lewis St., Needham, Mass. 02192

[22] Filed: Oct. 29, 1974

[21] Appl. No.: 518,500

Related U.S. Application Data

[63] Continuation of Ser. No. 338,102, March 5, 1973, abandoned.

[52] U.S. Cl. .................. 350/55; 350/29; 350/72; 350/201
[51] Int. Cl. .......................................... G02b 23/06
[58] Field of Search .................... 350/55, 27–29, 350/199–201, 72

[56] References Cited
UNITED STATES PATENTS

| | | | |
|---|---|---|---|
| 2,166,102 | 7/1939 | Wild | 350/29 |
| 2,413,286 | 12/1946 | Buchele | 350/27 |
| 2,504,383 | 4/1950 | Bouwers et al. | 350/28 |
| 2,670,656 | 3/1954 | Braymer | 350/27 X |
| 2,817,270 | 12/1957 | Mandler | 350/201 |
| 3,285,128 | 11/1966 | Schlegel | 350/201 |
| 3,547,525 | 12/1970 | Rayces et al. | 350/201 X |
| 3,700,310 | 10/1972 | Rayces | 350/201 |

*Primary Examiner*—David H. Rubin
*Attorney, Agent, or Firm*—Schiller & Pandiscio

[57] ABSTRACT

The invention is a new telescopic optical system which comprises a corrected multi-element objective that includes a spherical primary reflecting mirror and a corrected multi-element erector with a spherical Mangin mirror for collecting and reflecting light from the main mirror and forming an erect real image at a plane within the system.

13 Claims, 4 Drawing Figures

PATENTED JUL 29 1975  3,897,133
SHEET 1

/ 1

TELESCOPIC OPTICAL SYSTEM

This application is a continuation of our copending application Ser. No. 338,102 filed Mar. 5, 1973 for Telescopic Optical System, now abandoned.

This invention relates to optical systems which combine refracting and reflecting optical elements and more particularly to an improvement in telescopic optical systems and binoculars.

A variety of optical systems comprising refracting and reflecting elements have been designed and used in the manufacture of telescopes, binoculars, opera glasses and similar viewing instruments. Some of these prior systems are described in U.S. Pat. Nos. 2,166,102, 2,504,383, 2,413,286, 2,317,270, 3,064,526, 3,468,597 and 3,552,819, and the references cited in the files of said patents. Of particular relevancy to this invention are those systems which employ Cassegrainian and Gregorian objectives. The Cassegrainian system comprises a concave main mirror and a convex secondary or collecting mirror while the Gregorian system uses a concave main mirror and a concave collecting mirror. In both cases, the collecting mirror serves to reflect light rays coming from the main mirror back through an aperture in the main mirror for reception by an ocular or eyepiece. To eliminate inherent errors, it is necessary with both systems to give the main and secondary mirrors aspherical surfaces. Thus, in the Cassegrainian system the main concave mirror is given a paraboloidal surface and the secondary mirror is given a hyperboloidal surface to eliminate spherical aberration. Spherical aberration is corrected in the Gregorian telescope by using a paraboloidal primary mirror and an ellipsoidal concave collecting mirror. With both systems more complicated aspheric surfaces are required to be generated if still other errors, e.g. coma, are to be corrected. The difficulty in making aspheric surfaces, combined with the restricted field of view obtained with such surfaces, has resulted in development of telescopes employing spherical mirrors and spherical correctors to compensate for the spherical aberration of the spherical mirrors. However, spherical correctors introduce chromatic aberrations. Accordingly, it has been attempted to design telescope objectives that use only spherical reflecting surfaces and which nevertheless have good correction for chromatic and spherical aberrations and also coma. One such objective is shown in U.S. Pat. No. 2,817,270 wherein the main and secondary mirrors are Mangin mirrors. As is well known in the art, the term "Mangin" mirror refers to a mirror that combines a positive spherical reflector with a negative refracting element having a spherical surface, the combination having an overall positive power. In the practice the reflector coincides with one surface of the refractive element and takes the form of a coating of a reflective material such as silver or aluminum. An advantage of the Mangin mirror is that the composition (which determines its index of refraction), thickness and radii of curvature of its refracting element provide variables for correction of aberrations. However, prior telescopes using Mangin mirrors have not been fully satisfactory. Thus, for example, the system shown in U.S. Pat. No. 2,817,270 suffers from a number of limitations. Most notably it requires relatively long light stops, has a very narrow field of view, is characterized by certain constraints on correction of aberrations, is relatively expensive to manufacture and requires precise positioning of its elements. Furthermore, its use in binoculars is not advantageous since the arrangement and relative sizes of its elements causes the binoculars to be relatively heavy with a center of gravity located substantially nearer to its entrance pupil than to its main mirror, as a consequence of which the binoculars cannot be comfortably worn in the manner of spectacles. Other problems with prior art devices of the character described are misalignment of elements, and need for prisms or other elements to obtain an erect image.

Accordingly, one object of this invention is to provide an optical system for telescopes, binoculars and the like having an objective that utilizes only spherical reflecting surfaces and is substantially fully corrected for spherical and chromatic aberrations and other errors, such as coma, astigmatism, etc.

Another important object is to provide an optical system that makes possible the manufacture of telescopes, binoculars and optical instruments of similar purpose which are light weight, compact, relatively inexpensive and substantially free of misalignment problems.

Another object is to provide an optical system whose optical elements can be made of plastic.

Still another object is to provide a pair of binoculars that are adapted to be worn in the manner of spectacles, provide a satisfactory field of view, have a real image plane inside the instrument, and exhibit superior image stability in comparison to other optical systems of similar intent.

A further object is to provide a telescope that may but need not utilize aspheric reflectors, a field lens or a reticle.

Another object is to provide a telescope that utilizes a Mangin-type secondary mirror and has a concave primary mirror which may but need not be of the Mangin-type.

The foregoing objects and other objects hereinafter described or rendered obvious are achieved by a system which in its preferred embodiment comprises a corrected multi-element objective that includes a spherical primary reflecting mirror and a corrected multi-element erector with a second spherical Mangin mirror for directing light received from the primary mirror back toward the latter, and an eyepiece for viewing the erect image reflected by the erector. Relatively short length stops are employed to prevent passage of unwanted light to the eyepiece. As optional measures, the mirrors may be aspherical and a field lens and/or a reticle may be located at or near the image plane.

Other features and many of the attendant advantages are set forth in or rendered obvious by the following description which is to be considered together with the accompanying drawings wherein.

Figure 1:
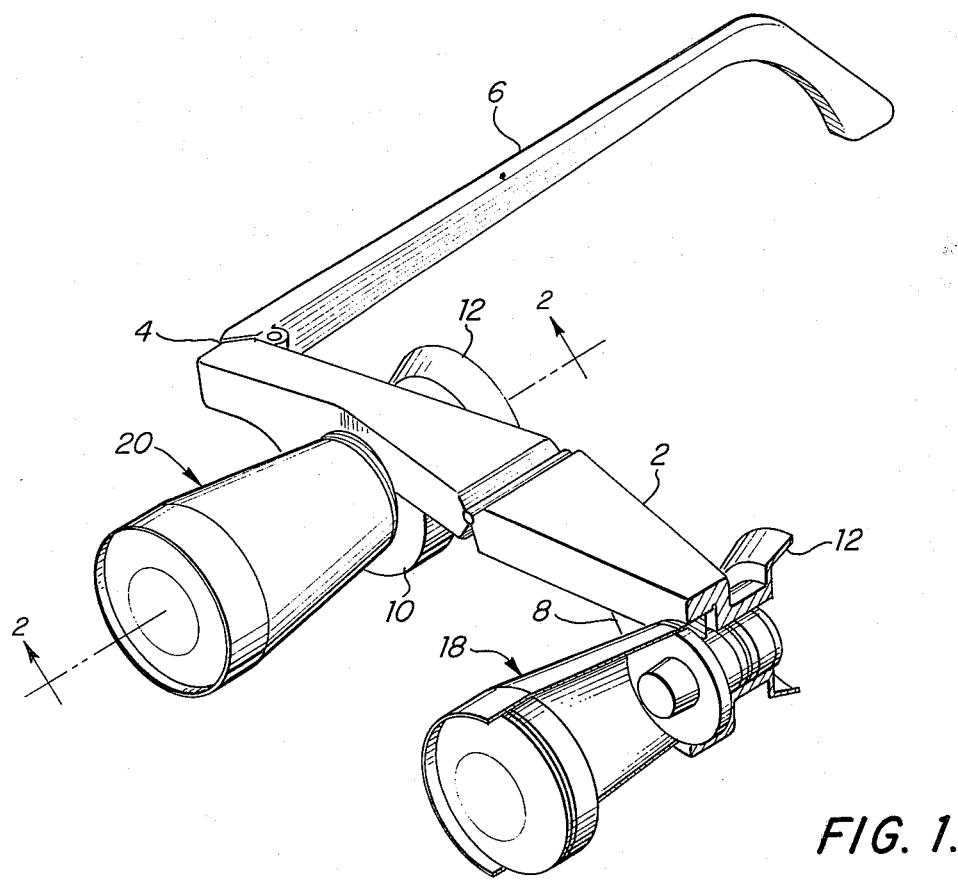
FIG. 1 is a fragmentary perspective view, partly in section, of binoculars embodying a preferred form of the invention.
Figure 2:
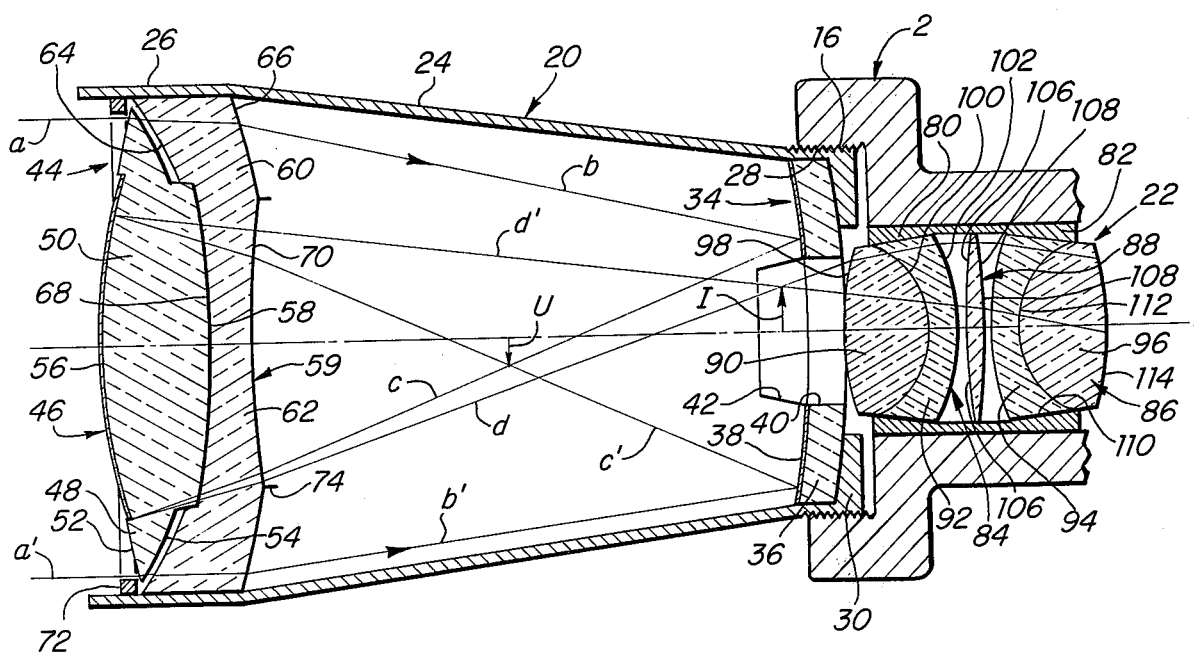
FIG. 2 is a longitudinal sectional view in elevation, taken substantially along line 2–2 of one of the two optical systems embodied in the binoculars of FIG. 1.

Turning now to FIGS. 1 and 2, a preferred embodiment of the invention is a pair of binoculars that may be worn in the manner of spectacles. The binoculars comprise a bridge or frame 2 provided at its opposite ends with hinge elements 4 to which are connected a pair of bows 6 (only one each of the hinge elements and bows are shown since one end of the bridge is broken away to illustrate certain elements of one of the dual telescopes that comprise the binoculars). In accordance with this preferred mode of practicing the invention, the bridge and bows are made of a suitable strong light weight plastic material. The bridge 2 is formed with two like rearward-extending tubular extensions 8 and 10 which are formed with (or have affixed thereto) enlarged tapered flanges 12 that function as light shades for the wearer. At the front of the tubular extensions 8 and 10, the bridge has enlarged openings 14 that are threaded as shown at 16 to receive and secure the threaded rear end sections of like tubular-shaped barrels 18 and 20 that house like telescopic optical systems which are described hereinafter. These novel objectives are used in conjunction with ocular or eyepiece optical systems 22 that are mounted within the tubular extensions 8 and 10. Details of a preferred form of eyepiece optical system are described below.

Referring now particularly to FIG. 2, the barrels 18 and 20 comprise a conically-tapered main section 24 and cylindrical front and rear sections 26 and 28 respectively. The rear section 28 of each barrel is threaded to mate with threads 16 of one of the bridge openings 14 and also is formed with an internal flange 30 which defines a circular opening that is aligned with the opening defined by the inner surface of the associated tubular extension 8 or 10. Mounted within each barrel and secured against its internal flange 30 is a concave spherical main mirror 34 which comprises a transparent disc 36 provided with a reflective surface coating 38 on its concave side. Mirror 34 is annular, being characterized by a circular center aperture 40 that is aligned with the axis of the associated tubular extension 8 or 10. Attached to the concave side of main mirror 34 in concentric relation to its aperture 40 is an opaque stop or diaphragm 42. The latter is tapered conically as shown.

Mounted within the cylindrical front section 26 of each barrel is a two element or doublet optical assembly identified generally by the numeral 44. The first or front element 46 comprises a zonal refractive portion 48 surrounding and integral with a central refractive portion 50. The zonal refractive portion is annular and comprises a convex front surface 52 and a convex rear surface 54 that coact so that the zonal refractive portion functions as a double convex lens. The surfaces 52 and 54 are both spherical. The central refractive portion 50 comprises a convex front surface (concave as viewed from the main mirror 34) that is provided with a reflective coating 56 and a convex rear surface 58. The front and rear surfaces of the central refractive portion 50 are both spherical. As is obvious to persons skilled in the art, the central refractive portion 50 and its reflective coating together constitute a Mangin mirror.

The second or rear element 59 comprises a zonal refractive portion 60 and a central refractive portion 62. The zonal refractive portion 60 is annular and comprises a concave front surface 64 and a convex rear surface 66, both of which are spherical. The central refractive portion 62 comprises a concave (convex as viewed from mirror 34) front surface 68 and a concave rear surface 70, both of which are spherical. Front surface 68 has the same radius of curvature as rear surface 58 of the front element. It is to be noted that in the illustrated embodiment, (a) the surface 58 of the front element is discontinuous with and offset from its surface 54, (b) the front surface 68 of the second element is discontinuous with and offset from its front surface 64, and (c) the diameter of surfaces 58 and 68 are such as to permit the latter to be nested within the inner edge of surface 64 against surface 58. In fact the front and rear elements are secured so that their surfaces 58 and 68 are in mutual engagement with each other as shown. This relationship may be achieved by cementing together the surfaces 58 and 68 with a suitable light-transmitting cement or by holding the front element against the rear element by mechanical means, e.g., a retainer ring 72 secured within the front section 26 of the barrel 18 or 20. In this connection it is to be noted that as a result of the angle formed by the tapered sections 24 of the two barrels with their front sections 26, the inner surfaces of the sections 24 function as mechanical stops to limit the extent to which the doublets can be pushed toward the main mirror and thereby determine the axial spacing between the doublets and main mirrors. It is to be noted also that in the illustrated embodiment the rear surface 54 of the front element is spaced from the adjacent front surface 64 of the rear element, thereby providing an air gap as shown which enters into the calculations for the specific designs of the front and rear elements. Completing the doublet is a stop or diaphragm 74 which is mounted on the rear side of the rear element in concentric relation with the spherical convex surface 70. The diaphragm 74 is of relatively short length and may be cylindrical (as shown) or conically tapered. In the latter case it is oriented so that its side walls converge with increasing distance from the surface 70.

From a functional standpoint, the above-described telescopic optical system, i.e., objective, may be considered to comprise the following: (a) a refractive entrance pupil consisting of the zonal portion 48 of the front element 46; (b) a corrector element consisting of the refractive zonal portion 60 of the rear element 59; (c) a main mirror 34; (d) a corrector element comprising the central refractive portion 62 of the rear element 59; (e) an image-erecting reflector or secondary mirror comprising the central refractive portion 50 and the reflective surface 56 of the front element 46; (f) light stop 42 which prevents light rays entering the system via the entrance pupil from passing directly to the eyepiece without reflection from the main and secondary mirrors; and (g) light stop 74 which prevents light rays reflected from the main mirror from passing back to the zonal portion 60 of the second element. Essentially, the diaphragms 42 and 74 avoid transmittance of false light which is troublesome to the receiver.

Viewed in a more general manner, the front and rear elements together comprise a compound erecting refractor and these elements together with the main mirror comprise a compound objective-erector. The zonal portions 48 and 60 together function as an acromatic doublet that is corrected for spherical and color aberrations and also for coma, astigmatism, distortion, etc.

The annular zonal refracting portion of the front element performs some corrections, but the bulk of the corrections are made in the zonal refracting portion of the rear element and the central refracting portions of both the front and rear elements 46 and 59. The zonal portion of the front element has positive power. Since its convex side faces the incident light, the light rays incident to that side are refracted towards the optical axis, so that the incident light beams undergo a decrease in section which makes it possible for the barrels 18 and 20 to be made tapered as shown. By properly designing the front and rear elements it is possible to correct and balance out substantially all of the aberrations and projecting errors normally attendant to spherical mirrors, notably spherical aberrations, coma and astigmatism.

The path of light rays in the compound objective-erector is as follows: The light rays $a$ and $a'$ coming from an object pass through the zonal portions 48 and 60 of the front and rear elements and proceed as $b$ and $b'$ until they are reflected by the main mirror 34 and travel as $c$ and $c'$ to and through the central refracting portions 62 and 50 of the rear and front elements to the reflecting surface 56 of the secondary mirror where they are reflected and directed as $d$ and $d'$ to the ocular 22. The image is inverted on reflection from the main mirror as indicated by the arrow U and erected on reflection from the secondary mirror as indicated by the arrow I. Hence the image viewed by the ocular is upright. Furthermore, the upright real image plane is within the telescopic optical system, notably in front of the primary mirror, thereby enabling the system to have a shorter physical length and simplifying the design of the associated eye-piece.

An advantage of the invention is that various forms of eyepieces, including a wide variety of known ocular designs, may be used which need not include prisms. Hence the illustrated eye-piece optical system hereinafter described is to be considered merely exemplary.

In the illustrated embodiment of the invention, each eye-piece comprises a sleeve formed in two interfitting aligned sections 80 and 82 that are secured together in a suitable manner, e.g., by a cement or welding, etc., to form a single unit. Each pair of integrated sections 80 and 82 is secured in one of the tubular extensions 8 and 10 of the bridge 2 as shown. Mounted within each pair of sections 80 and 82 are two doublets 84 and 86 and a singlet 88. The doublets 84 each consist of two lenses 90 and 92 and the doublets 80 each consist of two lenses 94 and 96. Lens 90 has a convex front surface 98 and a convex rear surface 100 that engages a complementary concave front surface of lens 92. The latter has a convex rear surface 102. Lens 88 has a convex front surface 106 and a convex rear surface 108. Lens 94 has a convex front surface 110 and a concave rear surface 112 that engages a complementary convex surface on lens 96. The latter has a convex rear surface 114.

It is preferred that the bulk of the desired degree of magnification be provided by the eyepiece and the remainder by the objective, notably the erector. The erector may have unity magnification with all or most of the magnifying power in the eyepiece, but preferably the erector has some positive magnification.

Following is design data for a preferred embodiment of the invention having a magnifying power of 6.927 and an aperture of 25 millimeters and in which all optical elements are made of plastic:

| Surface | Radius | Thickness | Refr. Index | Dispersion |
|---|---|---|---|---|
| 52 | 2.21361 | 0.00000 | 1.00000 | 0.00000 |
| 54 | −0.89730 | 0.19854 | 1.49100 | 0.00805 |

-Continued

| Surface | Radius | Thickness | Refr. Index | Dispersion |
|---|---|---|---|---|
| 64 | −0.84240 | 0.02534 | 1.00000 | 0.00000 |
| 66 | −1.82066 | 0.11250 | 1.59100 | 0.01906 |
| 38 | −2.23962 | 1.10000 | 1.00000 | 0.00000 |
| 70 | 2.85000 | −1.14063 | −1.00000 | 0.00000 |
| 58 | −1.80600 | −0.08750 | −1.59100 | 0.01906 |
| 56 | 1.23301 | −0.22500 | −1.49100 | 0.00805 |
| 58 | −1.80600 | 0.22500 | 1.49100 | 0.00805 |
| 70 | 2.85000 | 0.08750 | 1.59100 | 0.01906 |
| 98 | 0.52398 | 1.21862 | 1.00000 | 0.00000 |
| 100 | −0.17417 | 0.17230 | 1.49100 | 0.00805 |
| 102 | −0.35845 | 0.06815 | 1.59100 | 0.01906 |
| 206 | 1.27337 | 0.01000 | 1.00000 | 0.00000 |
| 108 | −1.42859 | 0.03171 | 1.49100 | 0.00805 |
| 110 | 0.44591 | 0.01000 | 1.00000 | 0.00000 |
| 112 | 0.16316 | 0.04400 | 1.59100 | 0.01906 |
| 114 | −0.78982 | 0.18750 | 1.49100 | 0.00805 |

The spacing between the reflective surface 38 of the main mirror and the surface 70 of the second element 59 (measured along their axes) is approximately 1.14 inches.

An objective constructed in accordance with the foregoing design criteria is substantially fully corrected for spherical and chromatic aberrations as well as for coma, distortion and astigmatism. Furthermore, it provides a non-vignetted field of view of about 5°.

The invention is susceptible of certain modification. Thus, for example, the stop 74 may be omitted if the design of the elements 44, 59 and 34 is adjusted so as to render the stop unnecessary. Additionally, the zonal portions 48 and 60 of the front and rear elements may be designed so that the surfaces 54 and 64 engage each other. It also is contemplated that the disc 40 of main mirror 34 may be made without the aperture 40 or a lens may be mounted in aperture 40. In either case, of course, the reflective surface 38 is annular so as to define an aperture through which light rays may pass to the ocular 22. It also is recognized that other forms of conventional eyepieces may be used, notably those that are adapted to be adjustable with respect to magnification or focal length, e.g. the so-called "zoom" lens. It is to be understood that the location of the image plane may be adjusted by rotating the relative portions of the optical elements. Thus, in the illustrated embodiment, the location of the image plane is adjustable by rotating the barrels 18 and 20 relative to the tubular extensions 8 and 10 so as to increase or decrease the distance between the primary mirrors 34 and the second elements 59. It also is possible to replace the main mirror with a Mangin mirror.

The invention also lends itself to the use of aspherical lenses and mirrors and the interposition of reticles and field lenses between the objective-erectors and the eyepiece. Spherical lenses offer the advantage that they are cheaper to generate, but aspherical lenses are practical if the lenses are molded of plastic. If a field lens is used, it is placed at or near (to either side of) the erect image plane. A field lens is not required in the preferred embodiment described above. However, it is recognized that in other embodiments of the invention, a field lens may be desirable for the purpose of preventing vignetting or to prevent or alter field curvature. If a reticle is desired, it would be placed in the field plane and may be combined with the field lens if one is used.

The mirrored erector, i.e. the central portion 50 of the front element, which is essentially a color corrected Mangin mirror, may be made as a discrete element and located between the front and rear elements, i.e. the compound erector refractor may be in the form of a triplet assembly.

Figure 3:
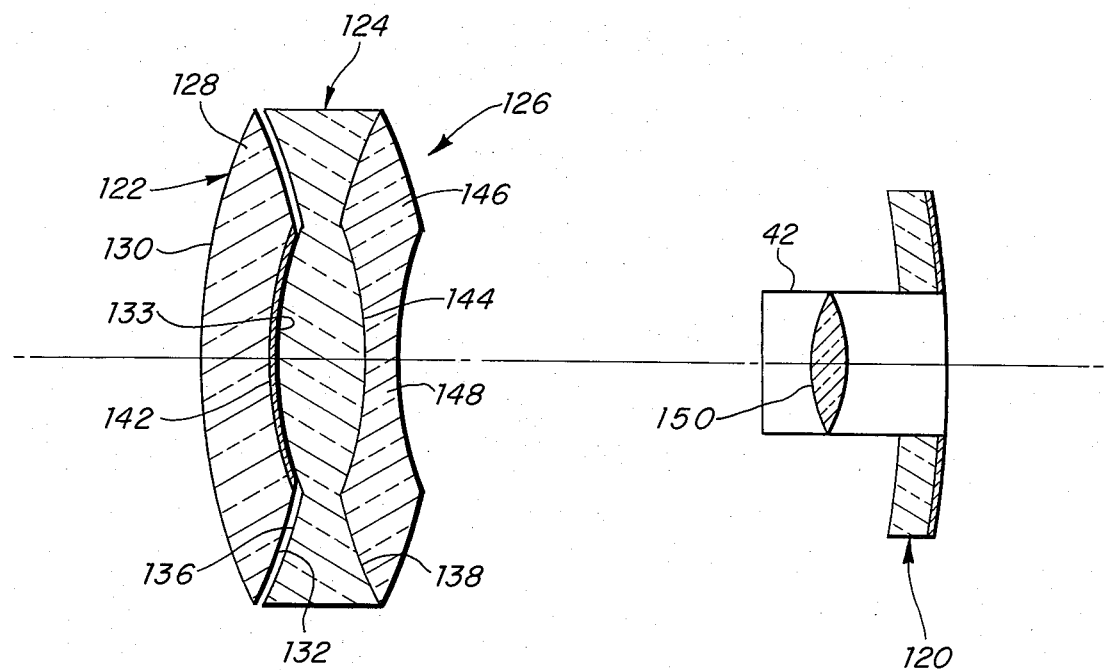
FIGS. 3 and 4 are views like FIGS. 2 of two modifications of the invention. FIG.
Figure 4:
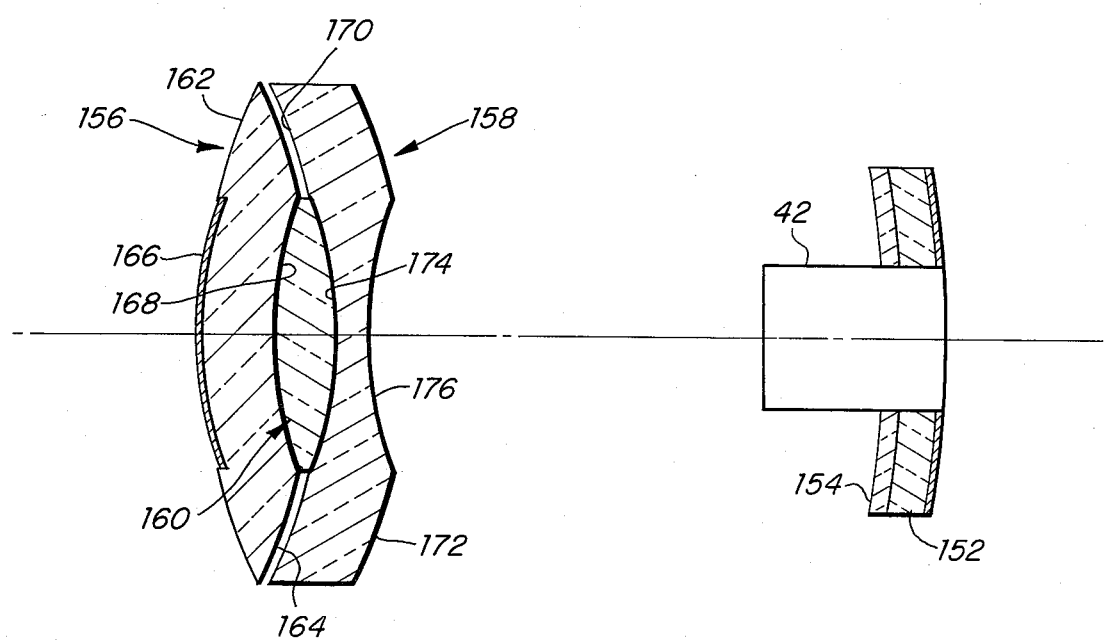

FIGS. 3 and 4 show two alternative modifications of the invention. For convenience, these figures omit the eyepiece and the barrel and associated mechanical members for supporting the illustrated optical elements.

The system of FIG. 3 comprises an apertured Mangin mirror 120 as the focusing reflector and a compound erecting refractor that is essentially a triplet objective with a "doublet" erector. More particularly, the refractor is an assembly of three optical elements 122, 124 and 126. The first or front element 122 comprises a zonal refractive portion 128 having a convex front surface 130 and a convex rear surface 132, and a central portion having a concave rear surface provided with a reflective coating 133. The second element 124 comprises a zonal refractive portion with a concave front surface 136 and a concave rear surface 138, and a central refractive portion having a convex front surface 142 and a convex rear surface 144. The surfaces 132 and 136 are spaced from one another but the surface 142 engages the reflective coating 133. The third element 126 has a zonal refractive portion 146 with a convex front surface and a convex rear surface and a central refractive portion 148 with a concave front surface and a concave rear surface. The front surfaces of the zonal and center portions of element 126 engage the corresponding rear surfaces of element 124. As is obvious, the rear and front surfaces of the zonal and central portions of elements 122 and 126 have the same radii of curvature as the confronting front and rear surfaces of the zonal and central portions respectively of element 124. Although the illustrated refractor has been described as being a triplet objective with a doublet erector, the two elements 124 and 126 actually behave as a three element erector due to the double transit of light through their central refractive portions as a result of the mirrored surface 133. If desired a field lens 150 may be mounted in a light stop 42 mounted concentric with the central aperture of the Mangin primary mirror 120.

FIG. 4 comprises a focussing reflector that includes a Mangin mirror 152 behind and engaging a concave-convex lens 154. The refractive media of mirror 152 and lens 154 may be the same or different as required. This form of focussing reflector, as is well known, is well adapted for color correction.

The compound erecting refractor is essentially a doublet objective and a triplet erector and comprises three elements 156, 158 and 160. The front element 156 has a zonal refracting portion with a convex front surface 162 and a convex rear surface 164, and a central refracting portion with a convex front surface having a reflective coating 166 and concave rear surface 168. The third refractive element 160 has a convex front surface engaging surface 168 and a convex rear surface. The second element 158 has a zonal refractive portion with a concave front surface 170 and a convex rear surface 172, and a central refractive portion with a concave front surface 174 and a concave rear surface 176. The rear zonal surface 164 has the same radius of curvature as, but is spaced from, the front zonal surface 170. The rear central surface 168 of element 156 and the front central surface 174 of element 158 engage and have the same radii of curvature as the front and rear surfaces of element 160. It is to be noted that the three element erector of FIG. 4 behaves as if it were a five element symmetrical system due to the double transit of light through the central refractive portions of the three elements as a result of the mirrored surface 166. Obviously the system of FIG. 4 may include a field lens as in the system of FIG. 3 if desired.

Two important advantages of the present invention are its simplicity and the fact that all of the lenses and mirrors can be molded of a suitable transparent plastic material, e.g., an acrylic resin such as Lucite or Plexiglas, or a polycarbonate or polystyrene resin. Of course, the optical elements also may be made of glass. The use of plastic elements, however, is preferred for reason of lower cost, ease of fabrication, and substantially lighter weight. Another advantage is that relatively short diaphragms are required to be used to prevent undesired light from reaching the eye-pieces. Still another advantage is that the overall length of the objective-erector can be kept quite short. Still a further advantage is that it is possible to provide objective-erectors providing a field of view of about 5 degrees or more. Yet another advantage is that it may be made in a variety of sizes and powers and may have interchangeable eyepieces of various characteristics or powers and filters may be included at the discretion of the user.

As a result the present invention makes it possible to construct binoculars which can be worn in the same manner as spectacles and which, because they are relatively light weight and have a center of gravity that is nearer to the eye-pieces than it is to the entrance pupils, can be worn for extended periods without undue discomfort to the wearer. The same may not be true of binoculars or field glasses that require prisms in order to obtain an erect image. Binoculars that can be comfortably worn as spectacles are desirable since they allow the user's hands to be free and also close the "loop" between head movement and the direction of observation. The latter is quite important since it eliminates the fatiguing effect of an unstabilized image on the retinas of the user's eyes (it is to be noted also that the unstabilized image effect is magnified with increasing power of magnification). A further advantage is that the instrument provides an image which is erect (i.e. upright) both in the vertical and the horizontal (left versus right) directions without the use of prisms or multiple folded plane mirror combinations. Still another advantage of the invention is that it provides a real image plane with an erect image inside of the instrument; hence, the use of a reticle is optional. A further and major advantage is that alignment and spacing problems are minimal as compared with prior art systems. An incidental advantage is that the design permits the instrument to be light enough to float in water.

Although the invention has been described as applied to binoculars, it is to be appreciated that it may take the form of a single telescope system. Also, the eyepiece may be such that the device provides minification rather than magnification of the viewed object.

What is claimed is:

1. A catadioptric system comprising:
   a concave main mirror having a central light aperture;
   a first plural element correcting refractor positioned to intercept and refract light passing to said main mirror from outside said system, said first refractor comprising a first annular positive lens and a second annular negative lens positioned adjacent to said first lens and between said first lens and said main mirror, said first and second lenses being centered on the axis of said main mirror and said second lens being spaced from said main mirror with an air space therebetween;

a second plural element correcting refractor positioned to intercept and refract light reflected from said main mirror and to reflect said light back to said light aperture, said second correcting refractor being positioned centrally of said first refractor and comprising a third negative lens and a Mangin-type secondary mirror, said secondary mirror comprising a fourth positive lens and a concave reflector in contact with said fourth lens, said secondary mirror being positioned so that light reflected from said main mirror will pass through said fourth lens and be reflected back by said concave reflector, said third lens being positioned between said fourth lens and said main mirror so as to intercept and refract light passing to and from said secondary mirror; and an air space between said third lens and said main mirror;

said third lens being made of a material having a different index of refraction than the material of which said fourth lens is made, and said third lens and said secondary mirror coacting to direct light reflected by said reflector back toward said central aperture and being adapted to form an erect real image between said third lens and said main mirror light aperture.

2. A system according to claim 1 further including an ocular comprising a refractive system positioned to receive light rays reflected by said secondary mirror through said aperture for viewing said image.

3. A system according to claim 1 wherein said mirrors are spherical.

4. A system according to claim 1 comprising at least one element having a zonal refractive portion that forms part of said first correcting refractor and a central refractive portion that forms part of said second correcting refractor.

5. A system according to claim 1 comprising a first element having a zonal refractive portion that forms part of said first correcting refractor and a central refractive portion that forms said fourth lens, and a second element having a zonal refractive portion that forms another part of said first correcting refractor and a central refractive portion that forms said third lens, said central portion of said first element having a convex surface and said reflector comprising a reflective coating on said convex surface.

6. A system according to claim 1 wherein said main mirror is a Mangin mirror.

7. A system according to claim 1 wherein the surfaces of said correcting refractors through which light passes to and from said mirrors are all spherical.

8. A system according to claim 1 further including a tubular diaphragm surrounding said aperture, said diaphragm extending from said main mirror towards said secondary mirror a distance sufficient for it to prevent direct access of light from said first correcting refractor to said aperture.

9. A system according to claim 2 wherein said ocular is movable toward and away from said second correcting refractor.

10. A system according to claim 2 wherein said ocular is centered on and movable along the axis of said main mirror.

11. A system according to claim 1 wherein said third and fourth lens are in contact with one another with no air space therebetween.

12. A system according to claim 1 wherein said fourth lens is a convex-convex lens and said third lens is a concave-concave lens.

13. A catadioptric system comprising:

a concave main mirror having a central light aperture;

a refractive entrance pupil for passing light to said main mirror from outside said system, said entrance pupil comprising a first annular positive lens centered on the axis of said main mirror;

a first annular refractive corrector centered on said main mirror axis and positioned between said entrance pupil and said main mirror so as to intercept and refract rays of light passing from said entrance pupil to said main mirror, said first corrector being disposed adjacent to said entrance pupil and spaced from said main mirror with an air gap between said first refractor and said main mirror;

a secondary Mangin-type mirror positioned centrally of said first annular positive lens and comprising a concave reflector and a second positive lens in contact with said reflector, said secondary mirror being positioned so that light rays reflected from said main mirror will pass through said second positive lens and be reflected back by said concave reflector;

a second negative refractive corrector positioned centrally of said first corrector between said secondary concave mirror and said main mirror so as to intercept and refract light rays passing to and from said secondary mirror, said second corrector being made of a material having a different index of refraction than the material of which said second positive lens is made, said second corrector and said secondary mirror coacting to direct light reflected by said reflector back toward said central aperture and to form an erect real image between said second corrector and said main mirror, said first positive lens being made of a material having a different index of refraction than the material of which said first corrector is made.

* * * * *